LOGICAL DECISION CIRCUITS

Original Filed June 27, 1958

ABC IS NOT DIVISIBLE IF:
(1) A=0
AND (2) B=0 OR 1
AND (3) B=0 OR C=0 OR 1

INVENTOR
LAMAR D. SPRINGER
BY Louis A Kline
Richard G. Stahr
HIS ATTORNEYS

United States Patent Office 3,231,727
Patented Jan. 25, 1966

3,231,727
LOGICAL DECISION CIRCUITS

Lamar D. Springer, West Carrollton, Ohio, assignor to The National Cash Register Company, Dayton, Ohio, a corporation of Maryland Original application June 27, 1958, Ser. No. 744,977, now Patent No. 3,067,938, dated Dec. 11, 1962. Divided and this application May 1, 1962, Ser. No. 191,608
2 Claims. (Cl. 235—173)

This invention relates to logical decision circuits and, more specifically, to a logical decision circuit of the type which produces an output signal upon the coincident presence of one of preselected alternative combinations of input signals.

This application is a division of United States patent application Serial No. 744,977, filed June 27, 1958, now Patent No. 3,067,938 dated December 11, 1962.

In electronic computer and similar applications, it is frequently necessary to provide for a signal pulse upon the occurrence of preselected alternative combinations of signals. Conventional AND gates are senstitive to only one specific preselected combination of input signals but are incapable of distinguishing two or more combinations. Therefore, in applications which require production of an output signal upon the occurrence of any one of two ore more alternative combinations of input signals, it is necessary to provide a logical decision circuit which is sensitive to any one of the preselected alternative combinations and no others.

It is, therefore, an object of this invention to provide an improved logical decision circuit.

It is another object of this invention to provide an improved logical decision circuit which is sensitive to two or more preselected combinations of input signals and produces an output signal in response thereto.

It is a further object of this invention to provide a logical decision circuit comprising a novel combination of conventional AND, OR, and NOT circuits.

In accordance with this invention, conventional AND, OR, and NOT circuits are uniquely combined and interconnected in such a manner as to provide a logical decision circuit which will produce an output signal upon the coincident presence of its input terminals of any one of a plurality of different preselected alternative combinations of input signals.

Figure 1:
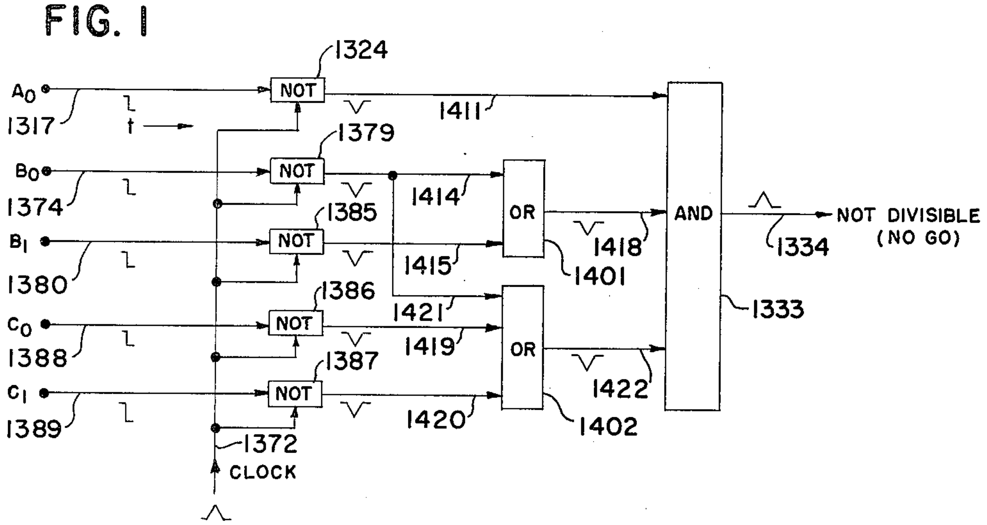
Figure 2:
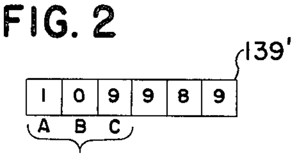

For a better understanding of the present invention, together with further objects, advantages, and features thereof, reference is made to the following description and accompanying drawing, in which:

FIGURE 1 is a block-type schematic diagram of the logical decision circuit of this invention, and FIGURE 2 represents the preselected combination of signals to which the logical decision circuit of FIGURE 1 is sensitive.

In the United States patent application hereinabove identified, of which this application is a division, a practical application of the novel logic decision circuitry of this invention was described in detail relative to providing novel controls in an electronic Sterling multiplier. However it is to be specifically understood that this novel circuitry may be used with other applications and is not to be construed as being limited to that specific embodiment.

As the details of the individual conventional AND, OR, and NOT elements form no part of this invention and are familiar to those skilled in the art, they have been shown in block form in FIGURE 1, where the logic decision circuitry of this invention which will produce an output pulse under the conditions set forth in FIGURE 2 is schematically set forth.

During the operating cycle of the Sterling multiplier device with which this circuit was employed, it was necessary to perform a division operation involving a series of successive substractions for the purpose of extracting from a lower denominate order accumulator all integral units of the next higher denominate order. For example, at the conclusion of the multiplying operation, all integral shilling units were extracted from the pence accumulator by successively subtracting 12, the number of pence in a shilling, until less than 12 pence remained in the pence accumulator. So that this extraction operation may be successively applied to the next higher denominate order accumulators, it was necessary to produce a "not divisible" signal when less than an integral unit of a higher denominate order remained in the next lower denominate order accumulator. It was for this purpose that the novel decision circuit of this invention was developed.

Each of the accumulators of the Sterling multiplier is composed of a separate recycling binary type decimal counter, termed order banks, for each the units, tens, hundreds, thousands, etc., decimal orders of value. Referring to FIGURE 2 ,the pence accumulator order banks are diagrammatically represented as a series of blocks wherein the blocks labeled "A," "B," and "C" are the hundreds, tens, and units order banks, respectively. Therefore any value of pence between 0 and 999 may be stored in these three banks. The total quantity stored in these banks is not divisable by 12 only if the quantity stored in "A" bank is 0, indicating the total quantity stored to be less than 100, and the quantity stored in the "B" bank is 0 or 1, indicating the total quantity stored to be less than 20, and the quantity stored in the "C" bank is 0 or 1, indicating the total quantity stored to be less than 12.

Each bank of the accumulator circuits is arranged to supply a negative-going direct current bias potential upon the readout lead corresponding to the value of the stored quantity. Therefore, to provide a logic decision circuit which is sensitive to all of the combination of input signals required to fulfill the "not divisible" conditions set forth in FIGURE 2, the input terminals of the respective NOT circuits must be connected to the 0 readout lead 1317 of the pence accumulator "A" bank; to the 0 readout lead 1374 and the 1 readout lead 1380 of the pence accumulator "B" bank; and to the 0 readout lead 1388 and the 1 readout lead 1389 of the pence accumulator "C" bank, as indicated.

The NOT circuits may be vacuum tube triodes having the cathodes connected to ground and the anodes connected to a source of positive potential which are arranged to be biased either to cut-off or to saturation. Common clock lead 1372 is connected to the control grid of each of the triodes, and the readout leads from the accumulator are connected to the control grid of the respective triodes. In the absence of a negative-going direct-current bias potential on the accumulator readout leads, the positive-going clock pulses applied to the control grids are ineffective because the triode is biased to saturation. With the presence of a negative-going bias potential on any of the accumulator readout leads, the associated triode is thereby biased to cut-off, and the positive-going clock pulses applied to the grids are of sufficient magnitude to overcome the negative bias, thereby causing the triode to conduct over the duration of the clock pulse. This results in a negative polarity signal at the anode terminal of the triode, which is taken off through a capacitor.

The A0 readout lead 1317 extends through NOT circuit 1324, which has an output lead 1411, to AND circuit 1333, which is arranged to supply a "not-divisible" (or NO GO) signal whenever all three of its inputs are present and of a negative polarity. The NOT circuit 1324 of the A0 readout lead 1317 also receives a positive-going clock pulse over common lead 1372. Whenever the content of the A bank is 0, a negative-going D.C. bias is supplied to the grid of the triode of NOT circuit 1324. This triode is either saturated or cut off according to the D.C. bias supplied by the readout lead 1317. Hence, the NOT circuit 1324 is receptive to the clock pulse when bank A is storing a "0" count, thereby permitting a negative-going pulse to appear on output lead 1411. The presence of the pulse on the lead 1411 indicates that condition (1) is true; i.e., $A=0$. However, this is but one of three inputs to the AND circuit 1333.

Similarly, in condition (2), if the "B0" readout lead 1374 from the "B" bank indicates a content of 0 in the "B" bank, a negative pulse is derived from the NOT circuit 1379 and applied over output lead 1414 to the OR circuit 1401. However, if the content of the "B" bank is 1, the readout 1380 provides a negative-going potential to the NOT circuit 1385 to produce a negative pulse on output lead 1415, which also extends to the OR circuit 1401. Hence, according to condition (2), if the "B" bank is storing either a 0 count or a 1 count, a negative pulse appears on the output lead 1418 from the OR circuit 1401 for application to the AND circuit 1333.

The first part of condition (3) is that the "B" bank must be storing a 0 count. Hence, the lead 1421 extends from the lead 1414, which is the output lead for the NOT circuit 1379 of the B0 readout lead 1374, to the OR circuit 1402. The OR circuit 1402 will also receive a pulse if the "C" bank is storing a 0 count or a 1 count. The 0 readout 1388 applies a negative-going D.C. bias to the NOT circuit 1386 to produce a negative-going pulse on the output lead 1419 as an input to the OR circuit 1402, whenever the count in the "C" bank is 0. Similarly, a 1 count in the "C" bank provides a negative-going bias over the "1" readout lead 1389 to the NOT circuit 1387 for developing a negative-going pulse on the output lead 1420 for application to the OR circuit 1402. Obviously, pulses cannot be obtained from both of the C0 and C1 readout leads at the same time, because the count of the "C" bank cannot be both 0 and 1. However, the OR circuit 1402 requires only a single input to obtain an output negative pulse on the lead 1422 for the AND circuit 1333.

The AND circuit 1333 is a Rossi type circuit, wherein three triode tube sections are normally conducting, and only the simultaneous application of three negative-going pulses to the grid circuits of these tubes will increase the common anode potential to produce a positive output signal indicative of a "not-divisible" condition.

Under the conditions hereinabove described, the requirement of three negative-polarity pulses coincidentally applied to the three input terminals of the AND gate 1333 to produce an output signal therefrom is satisfied. The signal thus produced may be directed to other circuitry and used to initiate a variety of additional functions as required.

While a single embodiment of the present invention has been shown and described, it will be obvious to those skilled in the art that various modifications and substitutions may be made without departing from the spirit of the invention, which is to be limited only within the scope of the following claims:

What is claimed is:

1. A logical decision circuit comprising, in combination, an AND output circuit for receiving a first input lead which includes a NOT circuit; second and third input leads terminating in an OR circuit via a NOT circuit in each lead; a common lead from said OR circuit to the AND circuit; fourth and fifth input leads terminating in a further OR circuit via a NOT circuit in each lead; said further OR circuit receiving a connection via the NOT circuit from said second input lead; and a further common lead from said further OR circuit to the AND circuit.

2. A logical decision circuit comprising, in combination, an AND output element; a plurality of input leads for said decision circuit; NOT elements connected in each of said leads; a clock input circuit extending to each NOT element; a first OR element; a first combination of said input leads as determined by the decision requirements terminating at said OR element; a further connection from said OR element to said AND element; a further OR element; a different combination of said input leads as determined by the decision requirements terminating at said further OR element; a further common lead from said further OR element to said AND element; and a connection from one lead of said first combination to said further OR element via a NOT circuit.

References Cited by the Examiner

UNITED STATES PATENTS 2,787,416 4/1957 Hansen ---------- 235—173 X

OTHER REFERENCES

Pages 126–7, August 1956, Barnes, L. A.: "Boolean Algebra for Switching Circuits," Conover Mast Publications, 205 E. 42nd St., New York, N.Y., Electrical Manufacturing.

Pages 5–48, 1958, Truxal: "Control Engineers' Handbook," McGraw-Hill Book Company, New York.

Page 67, 1957, Richards: "Digital Computer Components and Circuits," D. Van Nostrand Company, Inc., 257 Fourth Ave., New York 10, N.Y.

Chapter 6, 1951, Keister, Ritchie and Washburn: "The Design of Switching Circuits," D. Van Nostrand Company, Inc., 257 Fourth Avenue, New York, N.Y.

ROBERT C. BAILEY, *Primary Examiner.*

MALCOLM A. MORRISON, *Examiner.*